United States Patent

Lacotte

[11] 4,001,874
[45] Jan. 4, 1977

[54] METHOD APPARATUS AND RECORD FOR DISTRIBUTING INFORMATION IN THE FORM OF COLOR IMAGES

[75] Inventor: Jean Pierre Lacotte, Paris, France

[73] Assignee: Thomson-Brandt, Paris, France

[22] Filed: Sept. 13, 1974

[21] Appl. No.: 505,949

[30] Foreign Application Priority Data
Sept. 14, 1973 France .............. 73.33136

[52] U.S. Cl. .................. 358/2; 350/3.5
[51] Int. Cl.² .............. H04N 9/02; G03H 1/28
[58] Field of Search ............. 358/2, 11, 12, 43–46, 358/48, 41, 42; 179/100.3 G; 178/6.7 A; 350/3.5

[56] References Cited
UNITED STATES PATENTS

| | | | |
|---|---|---|---|
| 2,983,784 | 5/1961 | Razdow | 358/6 |
| 3,363,054 | 1/1968 | Mason | 178/6.7 A |
| 3,511,553 | 5/1970 | Gerritsen et al. | 350/3.5 |
| 3,560,071 | 2/1971 | Silverman et al. | 179/100.3 G |
| 3,565,978 | 2/1971 | Folger | 350/3.5 |
| 3,572,881 | 3/1971 | Nishida et al. | 179/100.3 G |
| 3,615,123 | 10/1971 | Wuerker | 350/3.5 |
| 3,627,916 | 12/1971 | Restenreimer | 358/2 |
| 3,683,193 | 8/1972 | Weimer | 178/7.1 |
| 3,695,744 | 10/1972 | Clay | 358/2 |
| 3,726,991 | 4/1973 | Takeumura | 358/43 |
| 3,746,783 | 7/1973 | Gerritsen et al. | 358/2 |
| 3,813,685 | 5/1974 | St. John | 358/2 |

Primary Examiner—John C. Martin
Attorney, Agent, or Firm—Cushman, Darby & Cushman

[57] ABSTRACT

Three superimposed microholograms, corresponding respectively to the luminance, red chrominance and blue chrominance images, are recorded in respect of each color image. At the time of read-out, the illuminating beam is switched, at the rate of the line-scan function, between three separate positions and projects the above images on a single solid state vidicon. The read-out device can be adapted to an ordinary commercial color T.V. receiver.

20 Claims, 13 Drawing Figures

METHOD APPARATUS AND RECORD FOR DISTRIBUTING INFORMATION IN THE FORM OF COLOR IMAGES

The present invention relates to a holographic method, apparatus and record for distributing information in the form of coloured images.

According to the present invention, there is provided: a holographic method for distributing information in the form of coloured images which comprises the following stages:
  a. pre-recording on a photosensitive substrate of sets of three associated images, each set being associated to one said coloured image;
  b. recording from said photosensitive substrate on a photosensitive matrix of the microholograms of each said associated image, the three microholograms of a same said set of associated images being superimposed microhograms, and said superimposed microholograms being juxtaposed to form a continuous track;
  c. development and reproduction in the form of multiple copies, of said matrix;
  d. read-out of one said copy for supplying to a colour television receiver a video signal carrying said information;
said read-out including:
  moving said track at substantially constant speed;
  directing a read-out light beam onto part of said track;
  sequentially shifting said read-out beam from one to the other of three different angular directions;
  simultaneously projecting said three associated images from said part of said track illuminated by said beam, each of said associated images being sequentially shifted from one to the other of three different positions in relation with said angular direction of said read-out beam;
  arranging single scanner means in one of said positions for sequentially receiving each of said three associated images and supplying said video signal; said shifting from one to the other of three angular directions being sychronised with the line scan function of said scanner means.

According to the present invention, there is further provided: a halographic apparatus for distributing information in the form of coloured images, comprising a holographic recording device which includes:
  a source for emitting a coherent light beam;
  optical splitting means for splitting said beam into an object beam and a reference beam, said object and reference beams having a fixed interference zone;
  first step-by-step drive means for successively interposing, on the path of said object beam, associated images under the form of colourless transparencies, each set of three successive associated images being associated with one of said coloured images;
  deflection means and optical focussing means cooperating to consecutively concentrate said reference beam at three fixed points, said three fixed points being located in the interposition plane of said transparencies;
  second step-by-step drive means for displacing a photosensitive matrix in said interference zone;
  and a control generator for synchronously controlling said deflexions means and said first step-by-step drive means at a first frequency, and second step-by-step drive means at a second frequency, said first frequency being the treble of the first frequency.

According to the present invention, there is further provided: a holographic apparatus for distributing information in the form of coloured images, comprising a holographic read-out device which includes:
  a substantially monochromatic light source for emitting a read-out beam, said beam illuminating a fixed diaphragm aperture;
  deflecting means and optical focussing means arranged between said source and said diaphragm and cooperating to sequentially focus said read-out beam at three fixed coplanar concentration points;
  transporting means for continuously moving a record copy in the vicinity of said diaphragm aperture, said copy carrying sets of three superimposed microholograms and said sets being juxtaposed to form a continuous track, said track, illuminated by said read-out beam through said diaphragm aperture, diffracting three coplanar associated images;
  single scanner means for sequentially receiving one after the other each of said associated images, said read-out beam concentration point determining which of said associated images is received by said single scanner means, said scanner means scanning line by line said associated images to supply a video signal and emitting with each scan line a synchronization pulse;
  and a command generator for receiving said synchronization pulses and controlling said deflexion means to sequentially switch said concentration point in sychronism with said line scan.

According to the present invention, there is further provided: a holographic record for distributing information in the form of coloured images, which has the form of a disc, each face of said disc being reflective and carrying a continuous spiral track, said track being impressed upon said face in the form of relief variations and made of juxtaposed sets of three superimposed microholograms, each said set restituting, when illuminated by a substantially monochromatic light beam, three distinct coplanar associated images, red chrominance and blue chrominance images associated to one said coloured image.

BRIEF DESCRIPTION OF THE DRAWING

For a better understanding of the invention and to show how the same may be carried into effect, reference will be made to the ensuing description and the attached figures, among which.

DESCRIPTION OF THE PREFERRED EMBODIMENTS

According to the present invention, the method of distributing information in the form of colour images involves four stages.

The first stage consists in recording in respect of each colour image which the receiver is to display, a sequence of three colourless, transparent images which we will refer to hereinafter as associated images.

The second stage consists in recording the microholograms of said associated images in a matrix.

The third stage concerns the processing of the matrix thus obtained and its multiple copying in order to enable distribution of the effected recording to take place.

The fourth and final stage consists in reading out these copies in order to produce a video signal which can be injected into the input of a television receiver of ordinary commercial kind, to enable it to reconstitute the sequence of recorded images.

To understand the nature of the associated images which are recorded during the first stage of the method, it shall be reminded that in colour television at the time of transmission, three camera tubes, equipped with appropriate filters, furnish three signals of variable amplitude corresponding to the three colour components utilised in the trichromatic colour synthesis operation: $E_V$ (green component), $E_R$ (red component), $E_B$ (blue component).

For a colour image of order N, on the film a sequence of three associated images $N_1$, $N_2$, $N_3$ arranged end to end and all in the same order, is recorded; only the position of the image in the sequence indicates to what colour component the information it contains, relates; this information is coded for example in the form of variations in the transparency of a black and white film, which can be achieved by using signals appropriate to the nature of each associated image to modulate the electron-beam of an E. B. R. (Electron-Beam Recorder).

The first associated image $N_1$ of each sequence N is the luminance image, whose transparency at every point is a linear function of a value $E_Y$ defined in accordance with the criterion laid down by the International Lighting Commitee as:

$$E_Y = 0.59 E_V + 0.30 E_R + 0.11 E_B$$

The second and third associated images are respectively red chrominance $N_2$ and blue chrominance $N_3$, images; their transparency at any point is associated, by the same linear function as before, with the respective values $E_{CR}$ and $E_{CB}$ which are defined as follows:

$$E_{CR} = E_R - E_Y$$

$$E_{CB} = E_B - E_Y$$

Figure 1:
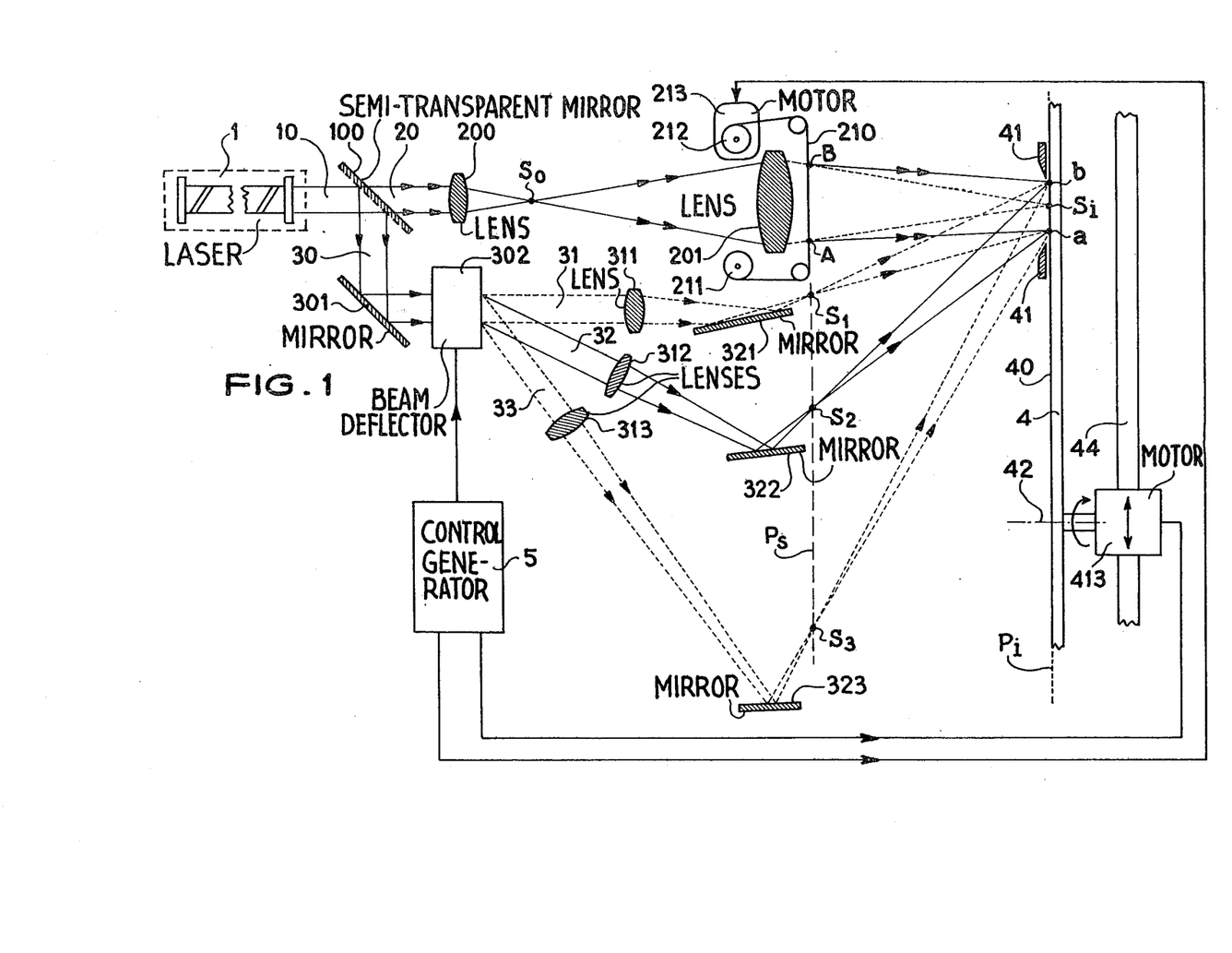
FIG. 1 illustrates a recording device in accordance with the invention.

FIG. 1, in the case of a precise, non-limitative example of an application, describes the second stage in the method of the invention, during which stage recording of the matrix is carried out, from the film previously described.

In this FIG. 1, there can be seen a laser source 1 emitting a parallel, coherent, monochromatic light beam 10. A beam splitter, here illustrated by the semi-transparent mirror 100, splits the beam into two parts which will respectively termed the object beam 20 and the reference beam 30.

Following the path of the object beam 20, a first objective lens 200 which concentrates the parallel beam at a source point $S_o$, and then a second objective lens 201 which concentrates the divergent beam emanating from $S_o$, at $S_i$, the latter being the image of $S_o$, are encountered. In the neighbourhood of the objective lens 201, there is arranged a film feed device comprising in particular the pay-off spool 211 and the take-up spool 212, the latter being driven by the stepping motor 213; this film feed device makes it possible to successively interpose in the trajectory of the object beam 20, the images, of size AB, recorded on the film 210, the latter being the film, carrying the associated images, obtained during the first stage. The object beam is diffracted by the recorded image and, in the plane $P_i$ perpendicular to the optical axis of the objective lens 210 and passing through the point $S_i$, there is obtained a light energy distribution extending around said same point $S_i$.

Following the path of the reference beam 30, we successively encounter a flat mirror 301 and a beam deflector 302; the latter, which may be an electro-optical system or acousto-optical system, makes it possible to deflect the reference beam 30 to one or the other of the three positions 31, 32, 33; the minimum value of the angles which these three positions must subtend in relation to one another, will be defined later on. Three objective lenses 311, 312, 313, and three flat mirrors 321, 322, 323, are respectively associated with the three positions 31, 32, 33 of the reference beam; they focus the reference beam, in each of its positions, respectively at the points $S_1$, $S_2$, $S_3$, and are arranged in such a way that on the one hand the three source points $S_1$, $S_2$, $S_3$, are disposed in one and the same plane $P_S$ containing the film 210, and on the other hand the beam emanating from one of these source points illuminates, in the plane $P_i$, a zone surrounding the point $S_i$.

A disc 4, coated with a photosensitive layer 40 is arranged in such a fashion that said layer coincides with the plane $P_i$. A square diaphragm 41 arranged in the immediate neighbourhood of the photosensitive layer, limits to the zone AB that region of the disc which is simultaneously illuminated by the two beams, object and reference. The disc 40 moves about its spindle 42. The stepping motor device 413, which can itself move on the slide 44, performs a dual action with each control pulse; on the one hand it rotates the disc through an angle such that the element of the sensitive surface, which is located beneath the opening in the diaphragm, is translated over a constant length, whatever its position in relation to the centre of the disc, this constant length being equal to the length ab; on the other hand, it displaces the spindle 42 of the disc by a constant distance along the slide 44.

The control generator 5 controls the synchronising of the operation of the deflector 302 and of the stepping motors 213 and 413. At time intervals equal to $t_1$, it supplies control pulses to the motor 213, controlling the film feed device; with each of these pulses, the film feed device advances the film by one frame. Likewise, with each interval $t_1$, a control pulse is supplied to the deflector 302 which circularly switches the position of the reference beam. A pulse synchronous with the preceding ones, but of periodicity $3t_1$, is supplied to the motor device 413 which thus displaces the disc when the reference beam has occupied its three successive positions.

The device for recording the matrix, described in FIG. 1, operates as follows:

An arbitrary associated image $N_i$, recorded on the film 210, on intercepting the object beam 20 at AB will furnish in the plane $P_i$, as precedently shown, a diffraction pattern, centered at the point $S_i$; because the plane $P_i$ passes through the point $S_i$ which is the conjugate of the source point $S_o$ illuminating the objective lens 210, this diffraction pattern has a special property: the spatial distribution of the diffracted light amplitude in the plane $P_i$ is the Fourier transform of the light amplitude of the radiation emerging from the film.

Whilst the image occupies the position AB, the reference beam will be assumed for example to occupy (under the action of the deflector 302) the position which makes it converge at the point $S_2$. The spherical wave issuing from the source point $S_2$ interferes in the zone ab of plane $P_i$, delimited by the diaphragm 41, with the diffraction pattern furnished by the image AB. The recording of the interference between the two beams on the photosensitive layer 40 carried by the disc 4, furnishes the hologram ab of the image AB, this being a special hologram since it is recorded in the plane in which the Fourier transform of the object AB is formed.

As pointed out earlier, the three source points $S_1$, $S_2$ and $S_3$ corresponding to the three positions of the reference beam 30, are located in the plane $P_S$ containing the film 210 carrying the image AB. The fact that the phase centre of the spherical reference wave is located in the same plane as the object whose hologram is to be recorded, characterizes a special type of hologram known as a hologram recorded under Fourier conditions or, more shortly, a Fourier hologram. Fourier holograms which may not necessarily be the result of an interference recorded in the plane in which the Fourier transform of the object is observed, although this is the case with the device described in FIG. 1, enjoy special and interesting properties the following one of which is essential for the later understanding of the read-out device: a hologram of this kind, illuminated by the read-out beam, reconstitutes of the object which has produced it, an image which retains a fixed position and dimensions when undergoing a translation in its own plane.

The recording of successive holograms in the matrix takes place in the following fashion, under the control of the control generator 5. At the instant at which the disc 4 advances a step, the film 210 unrolls and the first associated image $N_1$ of the sequence N stops at AB in the object beam 100; simultaneously, the deflector 302 deflects the reference beam 30 which, occupying the position 31, will converge at the point $S_i$; a first hologram $n_1$ is thus recorded at AB on the photosensitive substrate, during the time $t_1$. At the end of this time interval, the disc 4 remaining stationary, a pulse from the generator 5 causes the film 210 to unroll again, positioning the associated image $N_2$ at AB; a synchronous pulse supplied to the deflector 302 causes the reference beam 30 to converge at $S_2$ now; thus, a second hologram $n_2$ is recorded, again during a time $t_1$, on the same elementary area of the disc. The same procedure is repeated in respect of the third associated image $n_3$ and leads to the recording of a third hologram $n_3$ on the same elementary area of the disc which latter then advances another step, to commence a fresh sequence. Thus, with one and the same image, of order N, of the disc, three superimposed holograms corresponding respectively to the associated images $N_1$ (luminance), $N_2$ (red chrominance) and $N_3$ (blue chrominance) hereinbefore defined; each of these holograms is recorded using a reference beam which in relation to the object beam, has a different orientation so that the holograms can be differentiated at the time of the read-out phase.

Figure 2:
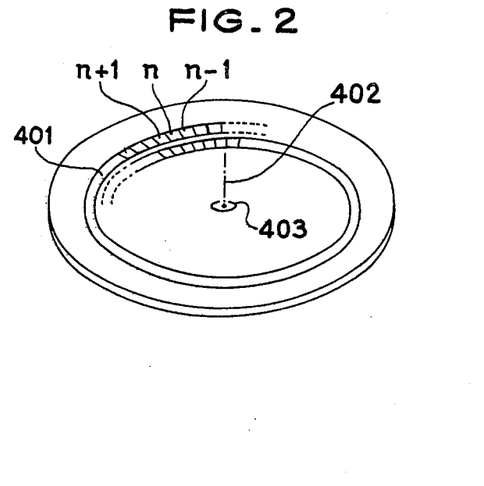
FIG. 2 illustrates the arrangement, in accordance with the invention, of holograms successively recorded on the matrix by the devices shown in FIG. 1.

Due to the simultaneous step-by-step movements which disc 4 performs, the sensitive elementary areas such as the element n, each comprising the superimposed holograms $n_1$, $n_2$, $n_3$, are arranged in the manner shown in FIG. 2, in the form of squares reproducing the aperture of the diaphragm 41 and disposed side by side along a track 401 taking the form of a constant-pitch spiral centered on the axis 402 of the disc. A circular hole 403 formed in the disc and centered on the same axis 402 makes it possible to position the disc on the spindle 42 of the motor. If the length ab has a value of 1 mm, then microholograms with an area of 1 mm$^2$ are obtained, this being an adequate value in order, at the time of read-out, to furnish an image whose definition is compatible with the definition of a television image.

In the device shown in FIG. 1, the plane $P_i$ in which the photosensitive layer 40 is located, is the plane in which the objective lens 201 produces the spatial Fourier transform of the image AB. This arrangement is by no means mandatory and the recording of microholograms can even be facilitated if the layer 40 is arranged slightly inside or beyond the plane $P_i$.

Figure 3:
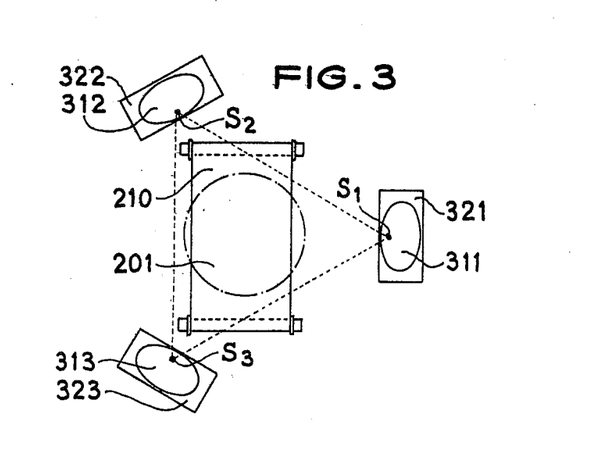
FIG. 3 illustrates a variant, in accordance with the invention, of the recording device of FIG. 1.

To facilitate the understanding of FIG. 1, the three source points $S_1$, $S_2$, $S_3$ have been shown aligned on one and the same straight line in the plane PS containing the film 210. FIG. 3 illustrates a variant embodiment of the device in accordance with the invention, in which the three source points $S_1$, $S_2$, $S_3$ are disposed at the corners of an equilateral triangle centered upon the optical axis of the objective lens 201. In FIG. 3, certain of the elements of FIG. 1 are to be seen again, represented by the same references. This variant embodiment has the advantage that it utilises three objective lenses 311, 312 and 313 which are identical to one another, and especially that it utilises three positions of the reference beam, in which the photosensitive surface is illuminated at the same angle throughout.

In FIG. 1 and 2, the photosensitive layer 40 enabling the holograms to be recorded, is arranged upon a disc, the microholograms being disposed side by side in order to form a spiral. Without departing from the scope of the invention, the photosensitive layer could equally well be arranged on a tape. The holograms would then be aligned along the tape axis and the motor 413 would be a stepping motor producing a fixed step and driving a film feed mechanism similar to the mechanism 211–212 of FIG. 1.

The third stage of the method in accordance with the invention pertains to the processing of the matrix after recording of the holograms using the device described in FIG. 1 and 3, and to the multiple copying of this matrix in order to enable the recorded information to be distributed. Still within the scope of the invention, different variant embodiments can be employed depending upon the nature of the substrate 4 and the photosensitive layer 40 utilised in the device of FIG. 1.

In accordance with a first series of variant embodiments, the copy substrate may be a transparent disc or tape; the holograms are then recorded in the form of variations in the transmission factor or refractive index of the photosensitive layer 40 which may for example consist of a silver halide emulsion. The copy is then produced by conventional techniques of photographic reproduction. Because of the system of operation by transparency, only one face of the copy substrate can be utilised.

A second series of variant embodiments consists in using an opaque substrate for the copies, which are then read-out by reflection, this enabling both faces of the copy to be utilised. The variations in luminous intensity forming the interference which constitute the copy hologram, are then translated either by variations in the reflection coefficient, for example by means of a silver emulsion deposited upon a reflective surface, or by variations in relief. To produce such relief variations in the matrix, it is possible to use as a photosensitive layer, a silver halide emulsion, a photo-resist or a thermoplastic material; in the two first instances, the layer is subjected to an appropriate developing process which can be accompanied, in the case of a silver halide emulsion, by a bleaching treatment to accentuate the relief. The relief thus produced in the matrix is then protected by the deposition of a fine metal layer, for example by vaporisation under vacuum. The great advantage of this technique of recording holograms in the form of relief variations in the matrix, resides in the fact that the copies can be produced directly by a simple pression operation, as is done with record discs.

It is important to underline the fact that whatever the method of duplication utilised, the copy obtained from a hologram is always a positive. In other words, the hollows and highspots in the copy of the relief, or the transparent zones and absorbent zones in copies operating by transmission, can be reversed without changing the nature of the image at the time of read-out of the copy.

The fourth stage of the method of the invention pertains to the "read-out" phase of the matrix copies thus produced.

Figure 4:
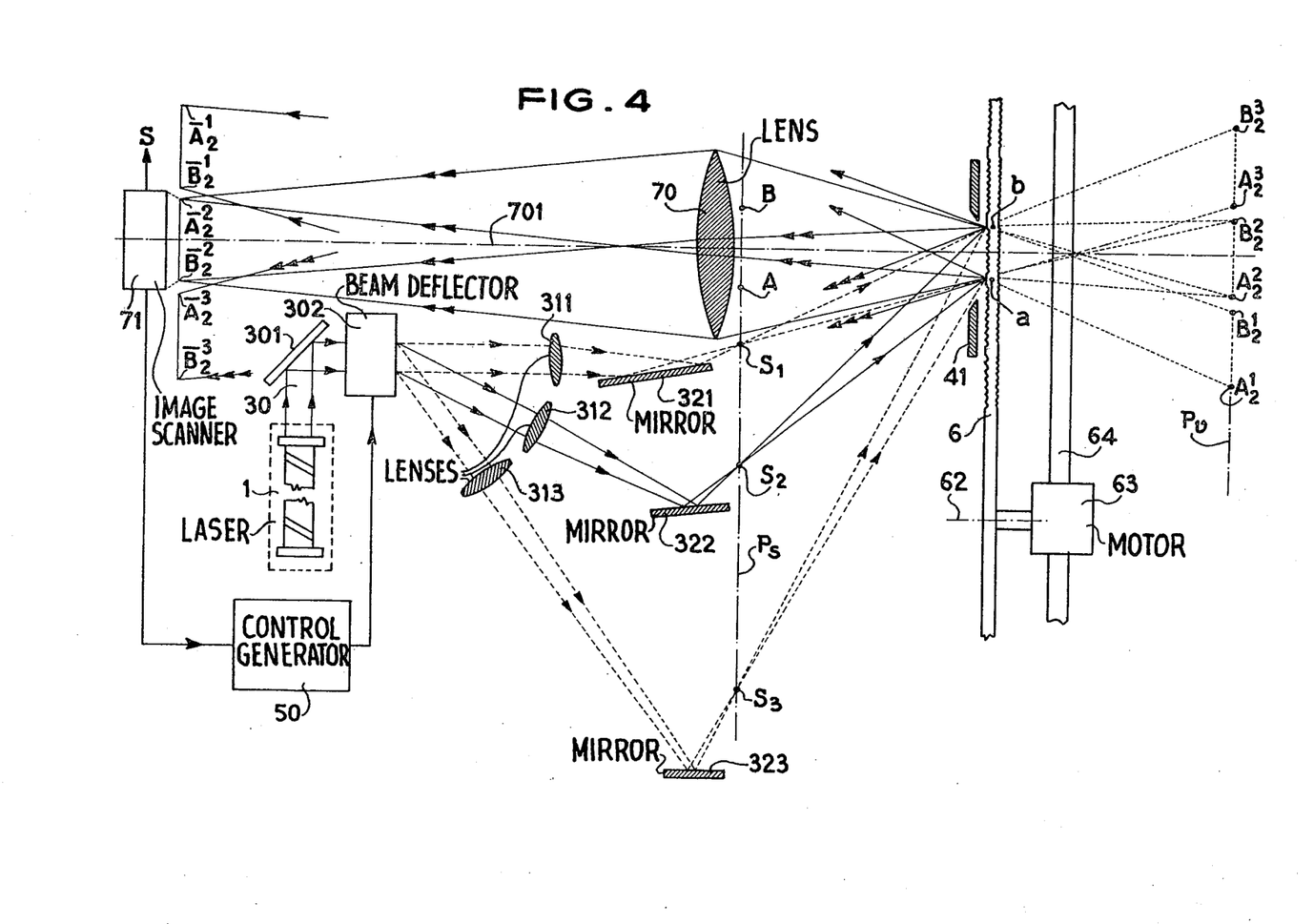
FIG. 4 illustrates a read-out device in accordance with the invention.

FIG. 4 illustrates by way of non-limitative example, a read-out device employing this process.

In FIG. 4, there will again be encountered a certain number of elements identical to those already illustrated in the recording device of FIG. 1 and carrying the same references: a laser 1 emitting the parallel coherent light beam 30, here called the read-out beam, the mirror 301, the beam deflector 302, the three objective lenses 311, 312 and 313 and the three associated mirrors 321, 322, 323. As in the case described by FIG. 1, this assembly of elements produces a divergent read-out beam transmitting a spherical wave centered, in accordance with the command applied to the deflector 302, on one of the points $S_1$, $S_2$ or $S_3$. Each of these three beams, through the aperture in the diaphram 41, illuminates the same elementary area $ab$ of the copy disc 6 which latter executes a continuous rotational movement about its axis 602 as well as continuous translatory motion along the slide 64, under the control of the motor 613. The disc is parallel to the plane $P_s$ containing the three sources $S_1$, $S_2$, $S_3$ and is located at the same distance from this plane as was the matrix disc in the device of FIG. 1.

The disc 6 is the copy obtained by one of the aforesaid methods, of the matrix 4 as shown in FIG. 2. FIG. 4 relates to the case where the surface of the disc is reflective and the holograms are recorded in the form of relief variations in the disc surface.

FIG. 4 also shows how there is an objective lens 70 with its optical axis 701 perpendicular to the disc 6; this objective lens picks up the light radiation coming from the read-out beam 30 and diffracted by the elementary area $ab$ of the disc 6, and projects it onto the image scanner tube 71. This scanner is a solid state vidicon of the B. B. D. (Bucket Brigade Device) or C. C. D. (Charged Coupled Device), type. The tube furnishes a video signal S the processing of which will be described later on; it also supplies line synchronization pulses which are applied to the input of the control generator 50 which controls the deflector 502.

FIG. 5 to 9, which enumerate some basic principles pertaining to the recording and read-out of holograms, are designed to facilitate understanding of the operation of the read-out device shown in FIG. 4.

Figure 5:
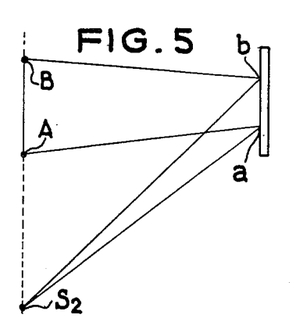
FIG. 5, 6 and 7, 8 and 9 are explanatory diagrams pertaining to the recording and read-out of holograms in accordance with the prior art.

FIG. 5 illustrates a simplified diagram of a device for recording the hologram $ab$ of a diffractive object AB, with the help of a divergent reference beam issuing from a point source $S_2$. In this diagram, the principle of the device shown in FIG. 1 will be observed once again.

Figure 6:
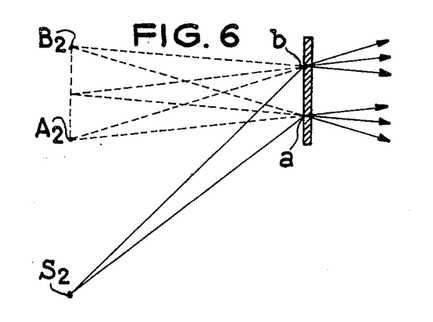
Figures 7, 8, 9:
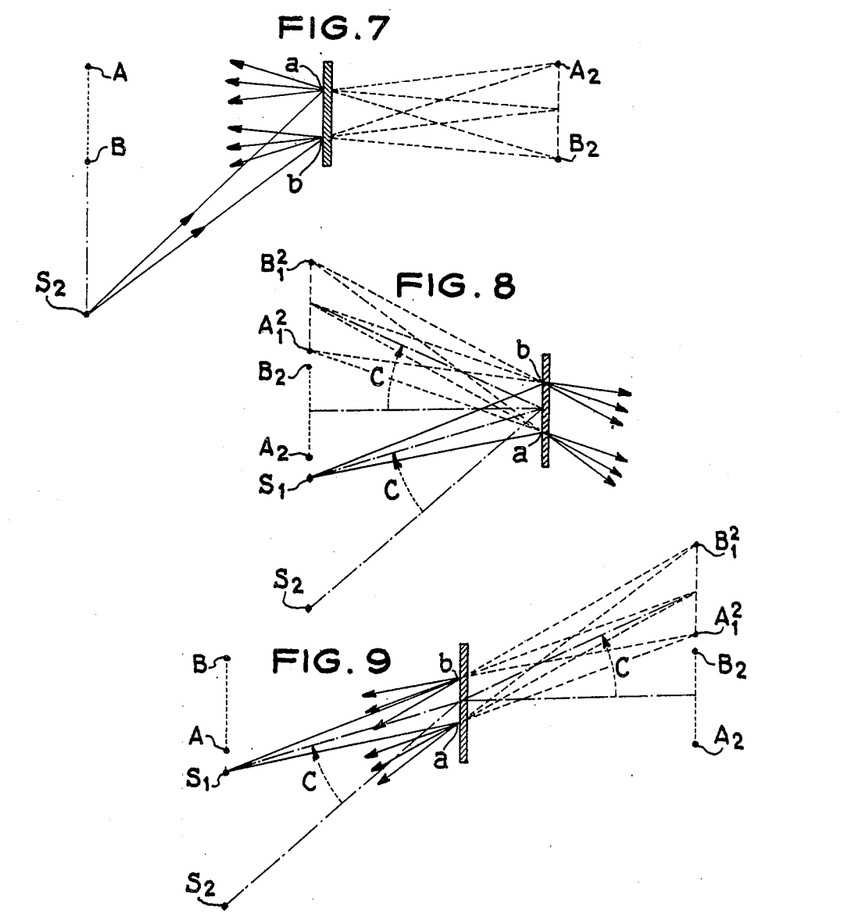

The diagrams of FIG. 6 and 7 illustrates how the hologram $ab$ thus obtained diffracts the read-out beam in order to reconstitute the initial image AB in the case where the position of the read-out beam in relation to the hologram, is identical to that of the reference beam which was used at the time of recording, the hologram being utilised in the transmission (FIG. 6) or reflection (FIG. 7) mode.

Considering FIG. 6, it will be seen how, under illumination by the beam $S_2$, each point in the hologram $ab$ transmits a diffractive beam stemming from a virtual image $A_2B_2$ which, in relation to the hologram, occupies the same position as the object AB. In FIG. 7, each point on the hologram $ab$ reflects a diffracted beam stemming from a virtual image $A_2B_2$ which occupies a symmetrical position, considered in relation to the plan of the hologram to that of the object AB.

The diagrams of FIG. 8 and 9 illustrate what happens when the position of the read-out beam in relation to the hologram differs from that of the recording beam, in the respective cases where the holograms is operated by transmission (FIG. 8) or by reflection (FIG. 9). In either case, since the source $S_1$ replaces the source $S_2$ and the read-out beam thus rotates through an angle C, the virtual image $A_2B_2$ diffracted by the hologram is thus replaced by the virtual image $A_1^2B_1^2$ (this is the image recorded using the source $S_2$ and read-out using the source $S_1$) which corresponds to a diffracted beam which has also rotated through an angle of C.

In order now to understand the operation of the read-out device described in FIG. 4, it will be considered, during a first phase, what happens at the precise instant at which the movements of rotation and translation on the part of the disc 6, brings the aperture of the diagram 41 precisely into register over the elementary area $n$ containing the copy of the three superimposed holograms $n_1$, $n_2$, $n_3$ corresponding to the colour image of order N. The read-out beam thus fully illuminates the three superimposed holograms $N_1$, $n_2$, $n_3$, and these only. It will be also assumed that at this same instant, the read-out beam occupies a position in which it emanates from the source point $S_2$.

Each hologram thus diffracts the read-out beam and consequently three beams diffracted by the elementary area ab are obtained, emanating from three virtual images $A_2'B_2^1$, $A_2^2B_2^2$, $A_2^3B_2^3$; these three virtual images are located in one and the same plane $P_v$, which, in relation to the surface of the disc illuminated by the read-out beam, occupies a position which is symmetrical with that of the plane $P_s$ which, in the device shown in FIG. 1, contained the image AB. Because the read-out beam comes from the point $S_2$, the image which is symmetrical with AB in relation to the disc and is therefore situated on the optical axis of the objective lens 70, is the image $A_2^2B_2^2$ furnished by the hologram $n_2$ and corresponding to the associated image $N_2$. The objective lens 70 is designed to receive the whole of the diffracted radiation coming from said virtual image and to project it at $A_2^2B_2^2$ so that it entirely covers the sensitive area of the image scanner tube 71.

The two other virtual images $A_2^1B_2^1$ and $A_2^3B_2^3$ correspond respectively to the holograms $n_1$ and $n_3$ read-out by the source $S_2$; they have been respectively recorded by means of the sources $S_1$ and $S_3$. These two virtual images, bearing in mind the explanations provided in respect of FIG. 9, are therefore offset to either side of the image $A_2^2B_2^2$ by distances which depend upon the angles respectively subtended by the beams issuing from the sources $S_1$ and $S_2$, and $S_2$ and $S_3$. Accordingly, in the recording device shown in FIG. 1, it is contrived that the three sources $S_1$, $S_2$ and $S_3$ are sufficiently far away from one another in order, at read-out, that the three images furnished by the three superimposed holograms, do not overlap each other. Under these conditions, the objective lens 70 projects onto the camera tube a single image, the two others forming outside the sensitive area; the projected image is thus the associated image $N_1$, $N_2$ or $N_3$ depending upon whether the read-out beam has come from $S_1$, $S_2$ or $S_3$.

In a second phase, it will be examined the much more general case in which the diaphragm 41 simultaneously selects on the track carried by the copying disc, two elementary areas of order $n$ and $n+1$, respectively containing the superimposed holograms $n_1$, $n_2$, $n_3$ and $(n+1)_2$, $(n+1)_3$. In other words, during the continuous movement of the disc, the element $n$ dissappears progressively from the diaphragm aperture and gives place to the element $n+1$, this posing two problems in relation to the image reconstituted by the hologram:

What is the effect produced by the continuous displacement of the hologram through the read-out beam?

What is the effect produced when part of one hologram and a neighbouring part of another hologram, are simultaneously illuminated by the read-out beam?

The reply to the first problem has been provided by the description of the recording device shown in FIG. 1; it is tied up with the special property of holograms recorded under Fourier conditions, namely that they reconstitute a fixed image of the recorded object when they are translated in their own plane. Recording under Fourier conditions is therefore an important feature of the invention, and one which makes it possible in the read-out system to give the disc a continuous motion, something much more simpler to achieve than the stepping motion which would be required if this condition were not respected.

The reply to the second problem resides in the general and well known property of holograms, namely that they are capable of reconstituting the whole image from any element of their area. Thus, when the elementary area $n+1$ progressively replaces the elementary area $n$ in the diaphragm aperture, the images associated with the colour image $N+1$ : $N+1)_1$, $(N+1)_2$, $(N+1)_3$, will follow the position of the read-out beam, progressively replacing on the sensitive area of the image scanner tube 71, the images associated with the colour image N: $N_1$, $N_2$, $N_3$. Thus, a phenomenon similar to that of the kind of lap dissolve encountered in cinematography, is observed, and this is one of the associated advantages of the method of the invention.

Summarizing, the method of the invention makes it possible to produce on the surface of the image scanner tube, by acting upon the position of the read-out beam, one of the three associated images; luminance image, red chrominance image, blue chrominance image, hereinbefore defined. Apart from the brief instant for which the three superimposed holograms appear precisely in the diaphragm aperture, these associated images correspond in all cases to a mixture of two images, namely an image of order N and an image of order N+1.

Switching from one to the other of the associated images takes place in the rythm of the camera line scan function, the synchronization pulse produced at the end of line scan, by the camera tube 71, acting through the channel of the control generator 50 to control the deflector 302 which switches the read-out beam 30 from one to the other of the three positions $S_1$, $S_2$, $S_3$. The read-out sequence, programmed by the generator 50, is repeated every four lines and leads the read-out beam 30 to successively occupy the positions $S_1$, $S_2$ $S_3$. The luminance image, red chrominance image, luminance image and blue chrominance image thus appear successively on the camera tube at the line scan rate. The line P thus scans the luminance image, the line P+1 the red chrominance image, the line P+2 the luminance image again, the line P+3 the blue chrominance image, and so on. We will deal at a later point with the manner in which the video signal S thus produced by the camera tube, is processed.

The use of a solid state vidicon of the B.B.D. or the C.C.D. type, as an image scanner tube, instead of a conventional Vidicon tube, is a necessary part of the process. The associated images projected onto the camera tube are in effect switched at the line scan frequency and thus change every 64 micro seconds. It is imperative therefore that when a new image appears on the sensitive area of the camera tube, said sensitive area should have lost all trace of the preceding image. This is not the case with conventional vidicons which have a remanence in the order of some few hundreds of a second.

A supplementary advantage of the method of the invention resides in the fact that no strict synchronising is required between the movement of the disc and the scanning function of the camera. In other words, due to the "fade-in-fade-out" kind of projection, the image is projected onto the image scanner tube, and modified continuously. It is therefore sufficient for the motor 613 to impart to the disc a rotary motion such that the recorded track passes in front of the diaphragm 41 at a substantially constant speed, to drive it along the slide 64 at a speed of translation proportional to its speed of rotation.

However, in order for the recorded movements to be projected by the television receiver without giving an impression of acceleration, it is arranged that the speed of displacement of the track is such that the time taken by two successive groups of three holograms to occupy the same position in the read-out beam, is substantially equal to the camera field scan function.

In FIG. 4, the three sources $S_1$, $S_2$ and $S_3$ have been shown aligned on the same straight line. It goes without saying that if, in the recording device, the sources are disposed upon a circle concentric with the projection objective lens, this being the arrangement shown in FIG. 3, this arrangement will be retained in the read-out device, the three sources being then arranged upon a circle concentric with the objective lens 70.

In the device shown in FIG. 4, the optical part of the read-out device, comprising the diaphragm 41 and all the elements situated to the left thereof, is fixed and the disc is imparted a dual movement or rotation and translation, by the motor 613. Within the context of the invention, it is possible as FIGS. 10 and 11 show, to discard the translatory motion of the disc and therefore to maintain the axis of rotation thereof fixed, all the optical section, excluding the laser, being arranged in a mobile head.

Figure 10:
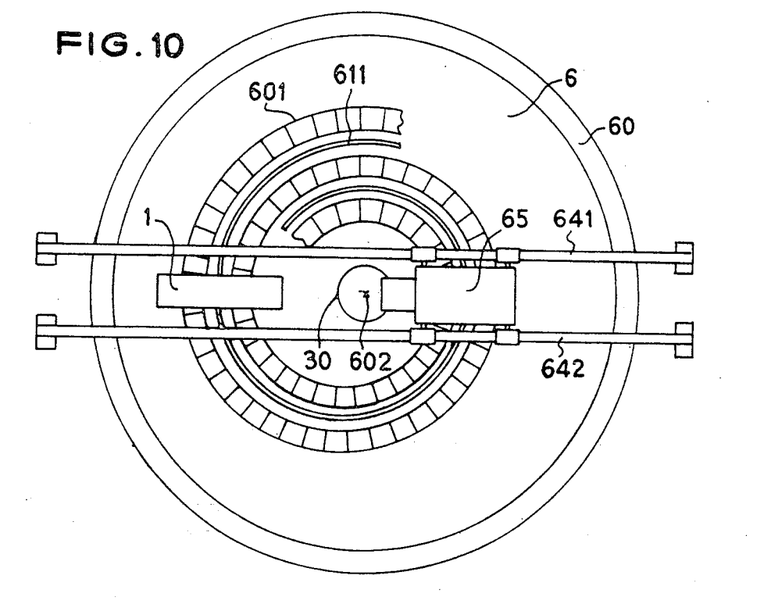
FIG. 10 illustrates, in accordance with the invention, a variant embodiment of the read-out device.

FIG. 10 illustrates the copying disc 6 arranged, like a conventional record player disc, on a concentric turntable 60; the turntable 60 is imparted a rotary motion about its axis 602 by a motor arranged beneath the turntable and not shown in the figure. The spiral track 601 is formed by the juxtaposition of elementary areas each comprising the three superimposed holographs. The grove 611 cut in the disc is arranged between two consecutive track elements and describes a spiral parallel to the aforedescribed spiral. Two parallel rails, 641 and 642, symmetrical in relation to a diameter of the turntable 60, enable a carriage 65 containing the optical section, with the exclusion of the laser 1 which emits the beam 30 parallel to the rails and penetrates into the interior of the carriage, to displace.

Figure 11:
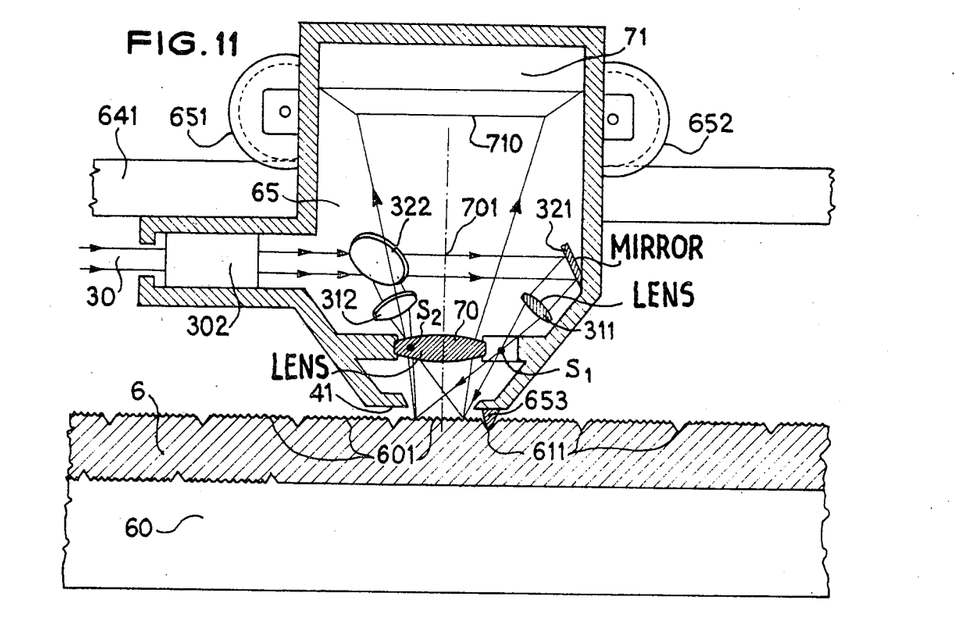
FIG. 11 illustrates a sectional view of a read-out head in accordance with the invention.

FIG. 11 is a sectional view of the carriage 65 and the disc 6 resting on the turntable 60. The rollers 651, 652 enable the carriage to roll on the rail 641. The bottom part of the carriage forms the diaphragm 41. To this same bottom part, there is attached a needle 653 which slides in the groove 611 and causes the carriage 65 to follow the relief track 601 as the disc 60 rotates. The read-out beam 30 penetrates into the interior of the carriage and then into the deflector 302. The arrangement of the optical read-out device corresponds with that of the recording device shown in FIG. 3; in accordance with the way in which the deflector 302 is controlled, the beam 30 is directed by the mirror 321 to the objective lens 311 which concentrates it at its focus $S_1$, or by the mirror 322 to the objective lens 312 which concentrates it at the point $S_2$; a third possible position of the beam corresponding to the mirror 323, the objective lens 313 and the point $S_3$ of FIG. 3, is not visible in FIG. 11. The three positions of the read-out beam are thus symmetrical in relation to the optical axis 701 of the objective lens 70 which projects the radiation diffracted by the track 601, onto the sensitive area 710 of the image scanner tube 71.

The groove 611 may also if required be used to record one or more sound tracks. It may also comprise a groove cut to produce a fixed frequency when the track is displacing at constant velocity; this frequency thus makes it possible to effect simple control of the speed of rotation of the motor driving the disc so that, whatever the radial position of the read-out head, the holograms pass before the diaphragm at constant speed.

It is equally possible, in a variant embodiment of the device shown in FIG. 10, to fix the mobile head shown in FIG. 11, to the end of an arm which can pivot about an axis located outside the turntable, similar to the pick-up arm of ordinary commercially available record players, of course, in this case the rollers are dispensed with. The laser beam, whose axis is the axis of rotation of the arm, then enters the latter via a mirror arranged at 45°.

The device shown in FIG. 4 can readily be adapted to the read-out of copy discs when the holograms are recorded in the form of transparency variations in the substrate. The virtual images $A^1$, $B^1$, etc. ..., then form at that side of the disc 6 which is illuminated by the read-out beam, and this means that the objective lens 70 and the image scanner tube 71 are arranged in symmetrical positions, vis-a-vis the plane of the disc 6, to those shown in FIG. 4.

An important element in the "read-out" stage of the method in accordance with the invention, pertains to the coding of the signal produced by the camera tube.

In other words, the signal S which is the output from the camera tube 71 in FIG. 4, is, as we have seen, formed by the sequential and periodic succession of four signals of equal duration (this duration being that of a scanned line or in other words 64 $\mu$us), corresponding respectively to the : luminance image, red chrominance image, luminance image, and blue chrominance image. However, the way in which the image is coded in accordance with the different standards SECAM, PAL, NTSC, differs and furthermore varies in accordance with these standards.

It is therefore necessary to transform the signal furnished by the camera tube into a composite signal which can be accepted by the composite video input of a receiver operating in accordance with given standards.

Figures 12, 13:
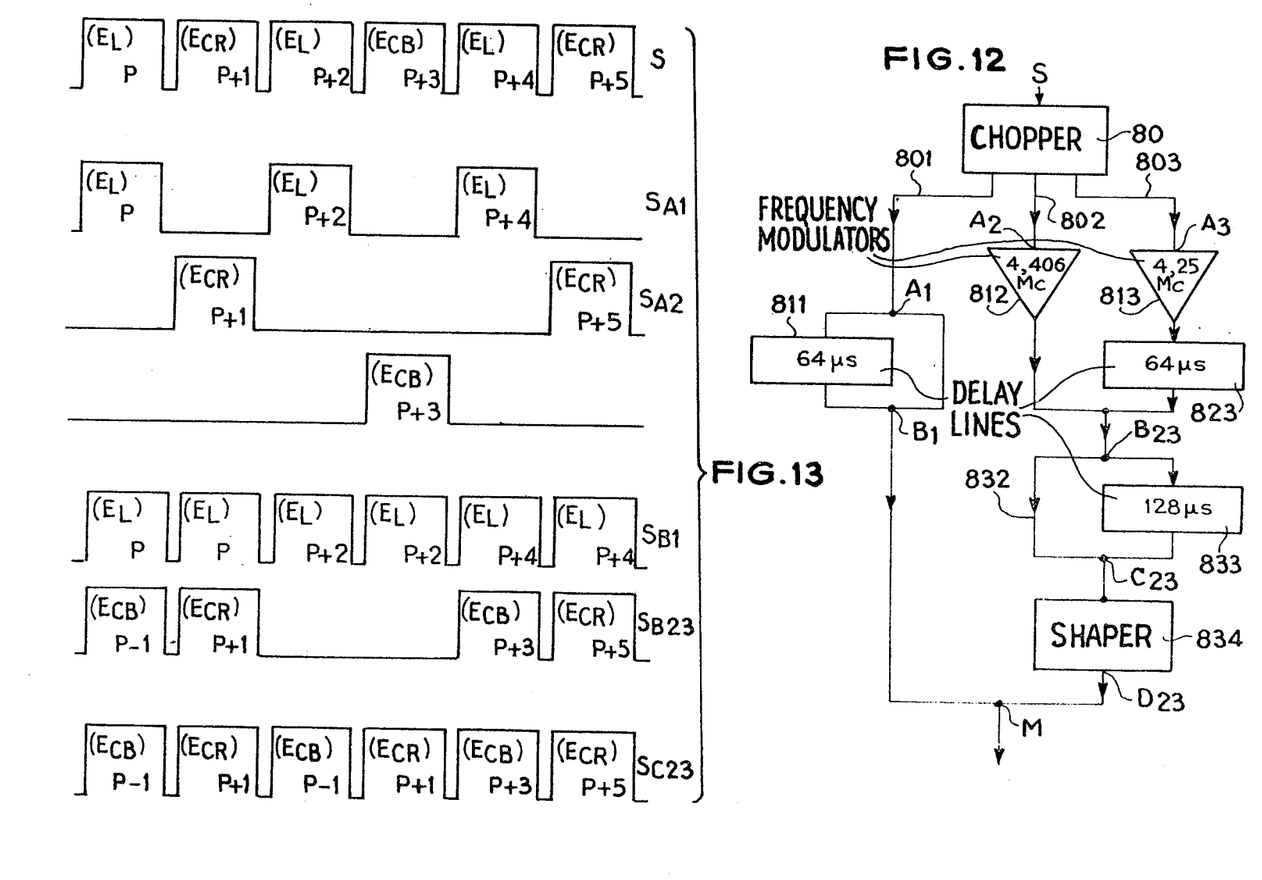
FIG. 12 illustrates the block diagram of a decoder in accordance with the invention.
FIG. 13 illustrates a diagram showing the behaviour of the signal at various stages in the decoder in accordance with the invention.

By way of example, FIG. 12 illustrates the block diagram of a device employing conventional television elements and making it possible to code the signal in order to make it compatible with the SECAM standards. Located opposite FIG. 12, FIG. 13 provides a diagram showing the behaviour of a signal at the different stages and in the different channels, between the input and the output of the decoder device shown in FIG. 12.

In the first line of the diagram of FIG. 13, there can be seen the video signal S which is the output from the camera tube, and is formed by the succession, every 64$\mu$us, of the following signals : luminance corresponding to the line of order P, or in other words $(E_L)_p$, red chrominance corresponding to line P+1, or in other words $(E_{CR})_{P+1}$, luminance corresponding to line P+2, or in other words $(E_L)_{P+2}$, blue chrominance corresponding to line P+3, or in other words $(E_{CB})_{P+3}$, luminance corresponding to line P+4, or in other words $(E_L)_{P+4}$, &c. &c.

This video signal is applied to the input of a chopper unit 80 constituting the first stage of the device shown in FIG. 14. This unit chops the signal S at the 64$\mu$us rate (this rate being the line scan rate of the camera tube) and applies it alternately to one or the other of the three channels 801, 802, 803 in the sequence channel 801, channel 802, channel 801, channel 803.

FIG. 13 shows the signals $S_{A1}$, $S_{A2}$, $S_{A3}$, in the second, third and fourth lines, which signals are respectively supplied to the channels 801, 802, 803. The signals $S_{A1}$, of channel 801, is formed by the luminance signal $E_Y$, belonging to the lines of order P, P+2, P+4 &c., each pulse being separated by a signal pause of the same duration. The channel 802 receives the signal $S_{A2}$ which is formed by the red chrominance signal $E_{CR}$ pertaining to the lines P+1, P+5 &c. and the channel 803 receives the signal $S_{A3}$ which is the blue chrominance signal pertaining to the lines P+3, P+7 &c. The signals $S_{A2}$ and $S_{A3}$ are constituted by 64µus pulses separated from one another by 192µus pauses.

Referring again to FIG. 14, it will be seen that channel 801, between the points $A_1$ and $B_1$, is split into two parallel channels: the channel 811 which is a delay line, producing a delay of 64µus in the transmitted signal, and the channel 821 which is a direct channel. The channel 802 leads to a frequency modulator stage 812 which puts the red chrominance signal $E_{CR}$ on a 4,406 M/C sub-carrier. Channel 803 leads to the frequency modulator stage 813 which modulates the blue chrominance signal $E_{CL}$ at 4.25 M/C; the signal $E_{CL}$ on the sub-carrier then passes through the delay line 823 which produces a delay of 64µus. The outputs of the modulator 812 and the delay line 823 are connected at the point $B_{23}$.

The fifth and sixth lines respectively of FIG. 13, show the signals $S_{B1}$ and $S_{B23}$ picked up at the points $B_1$ and $B_{23}$. The signal $S_{B1}$ is formed by the uninterrupted succession of the luminance signals, the signals of odd order being the repetition of signals of even order, obtained via the delay channel 811. The signal $S_{B23}$ is formed by the succession of the chrominance signals; it comprises: the blue chrominance signal $(E_{CB})_{P-1}$ relating to line P−1, coming from the delay line, then the red chrominance signal $(E_{CR})_{P+1}$ relating to the line P+1 and picked up directly at the output of the modulator 812, followed by a pause of 128µus, then the signal $(E_{CB})_{P+3}$, the signal $(E_{CR})_{P+5}$, &c. &c.

Considering FIG. 14, it will be seen that the signal picked up at $B_{23}$ is applied to two parallel channels, one of them 832, being a direct channel and the other being a delay line 833 which produces a delay of 128µus. These two channels are connected at the point $C_{23}$ which is the input of a conventional shaper stage 834 which performs on the frequency modulated chrominance signal an additional amplitude modulation (this latter stage is associated with a complementary ringing filter, which all SECAM receivers contain, their introduction making it possible to reduce the noise level). The outputs $B_1$ and $B_{23}$ are connected at the point M. The signal picked up at the point M is applied to the receiver input designed to receive the composite video signal.

The last line in FIG. 13 shows the signal $S_{C23}$ at the point $C_{23}$. It will be seen that the delay line 823, which introduces a delay corresponding to two lines, has made it possible to interpose between the signals $(E_{CR})_{P+1}$ and $(E_{CB})_{P+3}$ a repetition of the two signals $(E_{CB})_{P-1}$ and $(E_C)_{P+1}$.

The composite video signal applied to the input of the receiver thus has the same horizontal definition as the signal furnished by a transmitter station but a slightly poorer vertical definition since the information corresponding to one out of every two lines in the luminance and chrominance images, has been suppressed and replaced by redundant information. This minor drawback is largely compensated for by the other advantages already pointed out, of this method, namely: long-duration recordings, single camera tube for read-out, "fade-in/fade-out" images and absence of any need for strict synchronisation between the motion of the disc and the rate of scanning employed in the camera tube.

By way of example, the method makes it possible, on a disc of the same size as conventional microgroove long players, or in other words 30 cm diameter, to record micro-holograms 1 mm² in area. Since the track has a pitch of 1.2 mm, it is possible leaving a free space 10 cm in diameter at the centre, to record $5.2 \cdot 10^4$ colour images per side. At the ordinary read-out rate of 25 images per second, each face therefore has a recording capacity of 35 minutes corresponding to 70 minutes or more than one hour, in the case of a double-sided disc.

What I claim is:

1. A holographic method for distributing information in the form of coloured images which comprises the following stages:
    a. pre-recording on a photosensitive substrate of sets of three associated images, each set being associated to one said coloured image;
    b. recording from said photosensitive substrate on a photosensitive matrix of the micro-holograms of each said associated image, the three micro-holograms of a same said set of associated images being superimposed micro-holograms, and said superimposed micro-holograms being juxtaposed to form a continuous track;
    c. development and reproduction in the form of multiple copies, of said matrix;
    d. read-out of one said copy supplying to a colour television receiver a video signal carrying said information; said read-out stage including:
    moving said track at substantially constant speed;
    directing a read-out light beam onto part of said track;
    cyclically shifting said read-out beam from one to the other of three different angular directions;
    simultaneously projecting said three associated images, from said part of said track illuminated by said beam, each of said associated images being cyclically shifted from one to the other of three different positions in relation with said angular direction of said read-out beam;
    arranging single scanner means in one of said positions for receiving each of said three associated images and supplying said video signal; said shifting from one to the other of three angular directions being synchronized with the line scan function of said scanner means and occurring at the line scan rate of said scanner means.

2. A method as defined in claim 1, in which said three associated images are the luminance, the red chrominance and the blue chrominance images.

3. A method as defined in claim 2, in which said single scanner means alternately receive one said red chrominance image and one said blue chrominance image between two successive said luminance images.

4. A method as defined in claim 1, in which, during said recording stage, said microholograms are successively recorded by creating interference on said photosensitive matrix between an object beam passing through said associated image recorded on said photosensitive substrate and a reference beam carrying a spherical wavefront; the center of said spherical wavefront being located in the plane of said photosensitive substrate; said reference beam successively occupying three different angular positions; and each of said angular positions being respectively associated to one of said associated images.

5. A method as defined in claim 3, in which, during said read-out stage, said television receiver operating in accordance with the SECAM process:
said video signal supplied by said single scanner means is chopped in synchronism with said line-scan to form three separate signals, respectively the luminance, red and blue chrominance signals;
said luminance signal being applied to the composite video input of said receiver through two parallel luminance channels, said luminance channels respectively transmitting said signal without delay and with a delay of 64 μus;
said red and blue chrominance signals being respectively frequency modulated at 4.406 MC and 4.25 MC and then applied to said composite video-input through four parallel chrominance channels, first and second said chrominance channels respectively transmitting said red chrominance signal without delay and with a delay of 128μs; third and fourth said chrominance channels respectively transmitting said blue chrominance signal with delays of 64μs and 192μs.

6. A method as defined in claim 1, in which, during said stage of development and reproduction, the developing process applied to said photosensitive matrix results in the appearence of said microholograms in the form of relief variations, said copies being subsequently obtained by pressing from said matrix.

7. A holographic apparatus for distributing information in the form of coloured images, comprising a holographic recording device which includes:
a source for emitting a coherent light beam;
optical splitting means for splitting said beam into an object beam and a reference beam, said object and reference beams having a fixed interference zone;
first step-by-step drive means for successively interposing, on the path of said object beam, associated images under the form of colourless transparencies, each set of three successive associated images being associated with one of said coloured images;
deflection means and optical focussing means cooperating to concentrate said reference beam at three fixed points, said three fixed points being located in the interposition plane of said transparencies;
second step-by-step drive means for displacing a photosensitive matrix in said interference zone;
and a control generator for synchronously controlling said deflections means and said first step-by-step drive means at a first frequency, and said second step-by-step drive means at a second frequency, said first frequency being the treble of the first frequency.

8. A holographic apparatus as claimed in claim 7, in which said object beam having its axis perpendicular to said photosensitive matrix, said optical focussing means and said three fixed points are arranged in ternary symetry in relation to said axis.

9. A holographic apparatus as claimed in claim 7, in which said three associated images are the luminance, red chrominance and blue chrominance images.

10. A holographic apparatus for distributing information in the form of coloured images, comprising a holographic read-out device which includes:
a substantially monochromatic light source for emitting a read-out beam, said beam illuminating a fixed diaphragm aperture;
deflexion means and optical focussing means arranged between said source and said diaphragm and cooperating to cyclically focus said read-out beam at three fixed coplanar concentration points;
transporting means for continuously moving a record copy in the vicinity of said diaphragm aperture, said copy carrying sets of three superimposed micro-holograms and said sets being juxtaposed to form a continuous track, said track, illuminated by said read-out beam through said diaphragm aperture, diffracting three coplanar associated images;
single scanner means for cyclically receiving one by one said associated images, said read-out beam concentration point determining which of said associated images is received by said single scanner means, said scanner means scanning line by line said associated images to supply a video signal and emitting with each scan line a synchronization pulse;
and a command generator for receiving said synchronization pulses and controlling said deflexion means to cyclically switch said read out beam from one said concentration point to another at the line scan rate of said scanner means.

11. An apparatus as claimed in claim 10 further including optical projection means for projecting said associated images onto said single scanner means.

12. An apparatus as claimed in claim 10, in which said associated images are the luminance, red chrominance and blue chrominance images.

13. An apparatus as claimed in claim 12, in which said single scanner means alternately receive one said red chrominance image and one said blue chrominance image between two successive said luminance images.

14. An apparatus as claimed in claim 10, in which said scanner means are constituted by a solid state vidicon.

15. An apparatus as claimed in claim 10, in which said optical focussing means and said three concentration points are arranged in ternary symetry in relation to an axis perpendicular to said record copy.

16. An apparatus as claimed in claim 10, in which a cut groove being arranged parallel to said track on said record copy, a mobile head carries said deflexion means, said optical focussing means and said scanner means; a stylus running in said groove constraining said head to follow said track.

17. An apparatus as claimed in claim 13 further comprising to feed a SECAM television receiver composite video-input:
chopper means for chopping said video signal from said scanner means in synchronism with said line-scan and alternately distributing the luminance, red chrominance and blue chrominance signals;
a luminance channel for applying said luminance signal from said chopper means to said composite video input through a 64μus delay line and a direct line, said delay and direct lines being arranged in parallel;
a red chrominance channel for transmitting said red chrominance signal from said chopper means through a 4.406 MC frequency nodulator;
a blue chrominance channel for successively transmitting said blue chrominance signal through a 4.25 MC frequency modulator and a 64μus delay line;
a 128μus delay line shunted by a direct line for transmitting said red and blue chrominance signals from said red and blue chrominance channels to said composite video input.

18. A holographic record for distributing information in the form of coloured images, which has that form of a disc, each face of said disc being reflective and carrying a continuous spiral track, said track being impressed upon said face in the form of relief variations and made of juxtaposed sets of three superimposed microholograms, each said set restituting, when illuminated by a substantially monochromatic light beam, three distinct coplanar associated images, said associated images respectively being the luminance, red chrominance and blue chrominance images associated to one said coloured image and remaining substantially motionless in the space when said set is translated with respect to said light beam.

19. A holographic record as claimed in claim 18, further comprising on each face a cut groove, said groove being arranged parallel to said track.

20. A holographic record as claimed in claim 19, in which a conventional sound recording track is arranged in said groove.

* * * * *